No. 892,107. PATENTED JUNE 30, 1908.
G. R. WILLIS.
CHANGE SPEED GEAR.
APPLICATION FILED JULY 30, 1903.
2 SHEETS—SHEET 2.
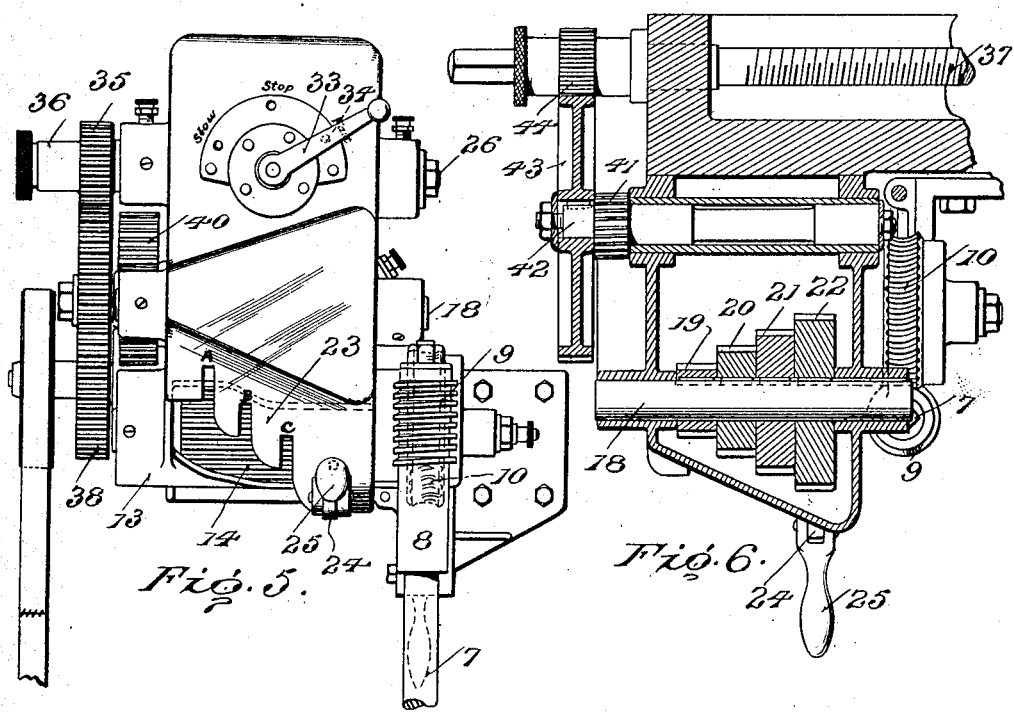
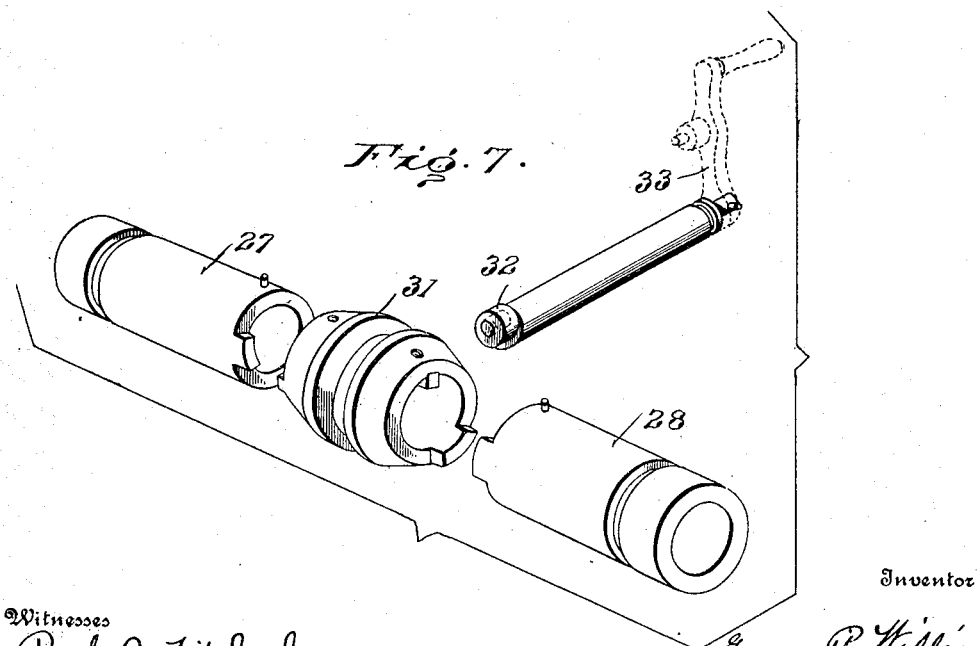
Witnesses
Ruth C. Fitzhugh.
Gustave R. Thompson.
Inventor
George R. Willis
By
Mauro Cameron Lewis Massie
Attorneys

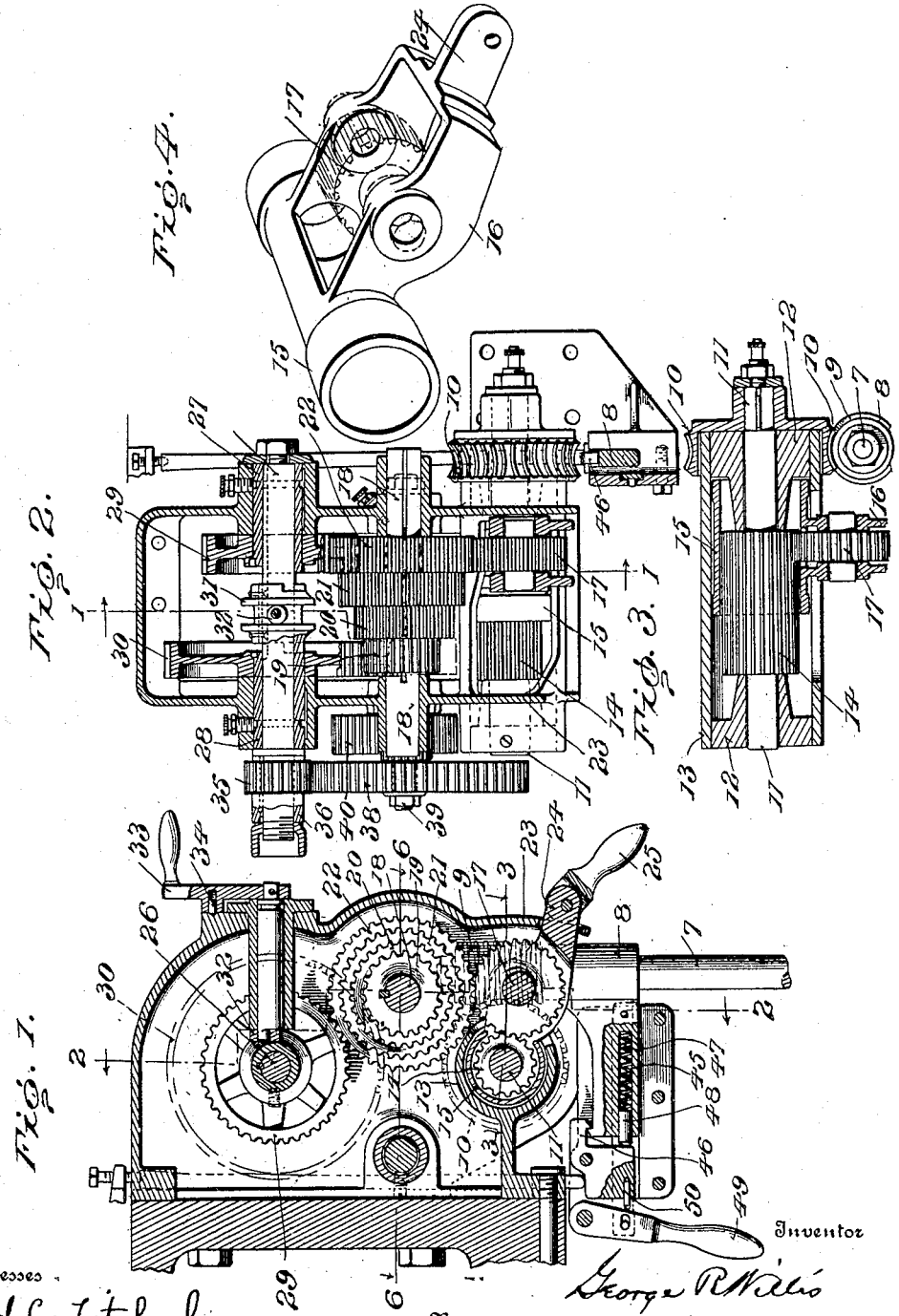

UNITED STATES PATENT OFFICE.

GEORGE R. WILLIS, OF FRANKLIN, PENNSYLVANIA, ASSIGNOR TO COLBURN MACHINE TOOL COMPANY, A CORPORATION OF PENNSYLVANIA.

CHANGE-SPEED GEAR.

No. 892,107.   Specification of Letters Patent.   Patented June 30, 1908.

Application filed July 30, 1903. Serial No. 167,630.

*To all whom it may concern:*

Be it known that I, GEORGE R. WILLIS, of Franklin, Pennsylvania, have invented a new and useful Improvement in Change-Speed Gear, which invention is fully set forth in the following specification.

This invention relates to a change speed gear, and has for its object to provide a mechanism of this class which shall enable the operator to readily and quickly alter the speed at which any machine or device actuated by such speed gear may be operated. The said speed gear constituting the invention may be applied to a great variety of machines, and for the purpose of illustration it is here shown as connected to the feed mechanism of a turning and boring mill.

The invention consists in the combination of elements and arrangements of parts hereinafter described and then pointed out in the claims.

The inventive idea is capable of receiving a variety of mechanical expressions, one of which, for the sake of illustration, is shown in the accompanying drawings, in which—

Figure 1 is a vertical section of a feed gear box or casing inclosing the mechanism constituting the invention, said section being taken on the line 1—1 of Fig. 2; Fig. 2 is a vertical section on the line 2—2 of Fig. 1, some of the parts being shown in elevation; Fig. 3 is a horizontal section on the line 3—3 of Fig. 1; Fig. 4 is a perspective view of the intermediate gear carrier with said gear shown in dotted lines; Fig. 5 is a view in elevation of the gear casing and certain of the connected parts; Fig. 6 is a horizontal section on the line 6—6 of Fig. 1; and Fig. 7 is a perspective detail of the clutch employed for connecting the change speed gear to the driven shaft.

Referring to the drawings, in which like numerals indicate like parts, 7 is a power shaft driven from any suitable source of power, with its upper portion taking bearing in any suitable bearing box 8, and having on its extreme upper end a worm 9 engaging a worm gear 10, which worm gear is keyed to a shaft 11, Fig. 3, having bearing in a pair of bushings 12, 12 inserted in opposite ends of a tubular portion 13 of the gear casing. Mounted upon the shaft 11 is an elongated pinion 14 the diameter of which is somewhat less than that of the tubular portion 13 of the casing supporting the bushings 12. Surrounding the pinion 14, but without making contact therewith, is a pinion carrier 15 sliding within the tubular portion 13. This carrier is best shown in position in Fig. 3, and its specific construction in detail is shown in Fig. 4. It is provided on one side with a yoke 16 at the inner face of which yoke the carrier is cut away so as to expose the pinion 14. The cheeks of the yoke 16 afford bearings for a pinion 17 shown in dotted lines in Fig. 4 and in full lines in Figs. 2 and 3, which pinion projects through the tubular bearing 13 of the casing and engages with the elongated pinion 14 on the shaft 11, the construction of the pinion carrier and the elongated pinion being such that the pinion may be adjusted to any desired position along the pinion 14 and remain in constant engagement therewith.

Referring now to Figs. 1 and 2, 18 is a shaft mounted in the feed gear casing immediately above the pinion 17 supported on the pinion carrier, which shaft 18 has keyed thereto four gears 19, 20, 21 and 22, each of the gears 20, 21 and 22 being of greater diameter than the gear immediately preceding it. Extending out from the pinion carrier is a portion of the gear casing in the form of an apron 23 (see Figs. 1 and 5) which apron is provided with vertically extending slots A, B, C and D, slightly below but immediately opposite the gears 19, 20, 21 and 22 on the shaft 18, these slots being of sufficient width to receive the handle portion 24 of the yoke 16 of the pinion carrier, to which handle portion there is pivoted a cam lever 25 (see Fig. 1). By means of this lever the pinion carrier may be adjusted horizontally so as to bring the handle portion 24 thereof opposite each one of the slots A, B, C, D, in the apron 23, and the said slots permit the yoke to be elevated, carrying with it the pinion 17 until said pinion engages the particular one of the pinions 19, 20, 21 or 22 on the shaft 18 opposite the given slot, when the cam lever 25 can be turned so as to cause it to securely engage the apron 23 and hold the pinion elevated so that power is transmitted from the elongated pinion 14 through pinion 17 on the pinion carrier to any one of the pinions 19 to 22, for example, pinion 22, as shown in Fig. 2. The feed shaft may have several feeds imparted thereto if desired, and it will be readily perceived that the shaft 18 may have four times as many speeds imparted thereto as are imparted to the driven shaft 7.

Mounted in the gear casing above the shaft 18, and in the same vertical plane as the shaft 11, is a shaft 26 (see Figs. 1 and 2), which shaft takes bearing and revolves within two sleeves 27 and 28 freely turning in bearings in the casing, and on the interior ends of these sleeves are keyed two gears 29 and 30, the larger gear 30 being constantly in mesh with the smaller gear 19 on the shaft 18, and the smaller gear 29 being constantly in mesh with the larger gear 22 on said shaft 18. Keyed to the shaft 26, but so as to slide longitudinally thereon, is a double clutch 31, illustrated in detail in Fig. 7. Engaging a peripheral groove in said clutch is an eccentric stud 32 operated by a lever 33 projecting outward through the gear casing, and provided with a spring detent 34 (Fig. 1) for engaging suitable depressions in the face of the casing to hold the lever in its adjusted positions. When the lever is in its vertical position, as shown in Fig. 1, the clutch is not engaged with either of the sleeves 27 or 28. By throwing the lever, however, to one side or the other, the clutch may be caused to engage with one or the other of the sleeves 27 and 28, for example, the sleeve 28, as shown in Fig. 2, thereby connecting the pinion 30 with the shaft 26, which shaft thereby has movement imparted to it from the shaft 18 through the pinion 19 in engagement with the pinion 30. If, on the other hand, the clutch 31 were in engagement with the pinion 29, the movements of the shaft 18 would be imparted to the shaft 26 through the pinion 22 and the pinion 29 engaging therewith, and since the pinions 29 and 30 are of different diameters it will be apparent that the shaft 26 may thus have twice as many speeds imparted thereto as may be imparted to the shaft 18. On the projecting end of the shaft 26 is a small slip pinion 35, Fig. 2, which is keyed to said shaft by a feather or spline and retained on the shaft by a nut 36. Through this gear the various speeds of the shaft 26 may be transmitted to the mechanism to be driven. For the purpose of illustration it is here shown as being transmitted to a screw-threaded feed shaft 37, Fig. 6, of a turning and boring mill. The gear 35 engages a gear 38, Fig. 2, on shaft 39, bearing also a gear 40 which gear in turn engages a gear 41 on a shaft 42 bearing also a gear 43 engaging with a gear 44 on the feed shaft 37.

For the purpose of throwing the power shaft 7 out of engagement with the worm-wheel 10, and thereby cutting off power from the feed gearing, the bearing 8 for the power shaft is made shiftable, having just sufficient horizontal movement to enable the worm to engage with or be disengaged from the worm-wheel. For this purpose the bearing 8 has a lateral extension 45 which is engaged by a pivoted catch 46 to hold the worm in engagement with the gear, the catch being pivoted upon a portion of the gear casing. A spring 47 is inclosed in a recess in the extension 45 and bears, through a pin 48, against the lower face of the catch 46, thereby tending to hold the catch in engagement with the extension. A lever 49, also pivoted upon the casing, bears with its inner face against a rigid pin 50 projecting from the catch, as shown in Fig. 1, and by pressing on the lever from left to right the catch can be raised from the position shown in Fig. 1, whereupon the spring 47 acts to throw the worm out of engagement with the worm gear. For the purpose of effecting the reëngagement of the worm and gear, the bar 8 may be thrown in against the tension of the spring 47 by any suitable mechanism, not shown.

It will be apparent that the application of this change speed gear mechanism to the device operated may be cut off in any one of three ways: first, by throwing the worm 9 out of engagement with the worm-wheel 10 by operating the lever 49; second, by disengaging the intermediate pinion 17 from any one of the gears 19 to 22 inclusive; and third, by adjusting the lever 34 into its middle position, as shown in Fig. 1.

By the gearing as hereinbefore described, there is provided a simple and effective mechanism whereby a great variety of speeds may be readily secured through the manipulation of a minimum number of parts by the operator, the whole speed gear being compact and readily applied in position where its use may be desired.

What is claimed is:

1. In a change speed gear, the combination of a power shaft, an elongated pinion driven thereby, a tubular casing surrounding said pinion, a pinion carrier supported by said tubular casing and longitudinally adjustable with relation to the elongated pinion, a pinion on said carrier, a plurality of gears of different diameters, and a shaft supporting said gears in position to be engaged by the pinion on the carrier.

2. In a change speed gear, the combination of a power shaft, an elongated pinion driven thereby, a tubular casing surrounding said pinion, a carrier supported by said casing and longitudinally adjustable with relation to the elongated pinion, a second pinion on said carrier and engaging the elongated pinion, a plurality of gears of different diameters, a shaft supporting said gears in position to be engaged by the pinion on said carrier, a clutch shaft, a pair of gears loose on said shaft and each engaging one of the gears of different diameters, and a clutch on said clutch shaft and adjustable into engagement with either of the gears on said shaft.

3. In a change speed gear, the combination of a power shaft, an elongated pinion operatively connected to said shaft, a plurality of gears of different diameters, a shaft supporting the same, a tubular casing surrounding said elongated pinion, a pinion carrier supported by said tubular casing and adjustable both longitudinally and circumferentially with relation thereto, a pinion supported by said carrier in constant engagement with said elongated pinion, and adjustable into engagement with any one of said gears of different diameters.

4. In a change speed gear, the combination of a casing, a slotted depending apron thereon, a tubular housing in said casing, an elongated pinion revolubly supported in said housing, a carrier supported by said housing and adjustable longitudinally and circumferentially of said housing, a connecting pinion on said carrier in constant engagement with said elongated pinion, a plurality of gears of different diameters, a shaft supporting said gears one opposite each slot in said apron, and means locking said pinion carrier in position in said slots.

5. The combination of a gear casing, an elongated pinion revolubly supported thereby, a tubular portion of said casing inclosing said pinion and out of contact therewith, an oscillatory and longitudinally adjustable carrier supported by said tubular portion, a connecting pinion supported by said carrier in constant engagement with said elongated pinion, a shaft, a plurality of gears of different diameters on said shaft in position to be engaged one at a time by the connecting pinion on the carrier.

6. In combination, a driven barrel-pinion, a curved hood concentric to the barrel-pinion and having an inclined edge portion and a series of slots adjacent thereto, an arm projecting beyond said edge portion, retaining means carried by said arm, a longitudinally slotted sleeve surrounding the barrel-pinion and supporting said arm, a gear carried by the arm and mechanism operated by the gear.

7. In combination, a shaft, an elongated pinion driven thereby, a tubular casing surrounding said elongated pinion, a pinion carrier supported by said tubular casing, a connecting pinion longitudinally adjustable with relation to the elongated pinion, a shaft, a plurality of pinions of different diameters and in position to be engaged by the pinion on the pinion carrier, a pair of independent gear wheels of different diameters each of which meshes with one of said plurality of pinions, a clutch shaft, a clutch keyed thereon and adjustable into engagement with either of said gear wheels.

8. In combination, a shaft, an elongated pinion driven thereby, a tubular casing surrounding said elongated pinion, a pinion carrier supported by said tubular casing, a connecting pinion thereon longitudinally adjustable with relation to the elongated pinion, a second shaft, a plurality of pinions of different diameters on said second shaft in position to be engaged by the pinion on the pinion carrier, and means for locking the carrier and connecting pinion in adjusted position.

In testimony whereof I have signed this specification in the presence of two subscribing witnesses.

GEORGE R. WILLIS.

Witnesses:
L. H. COLBURN,
WM. B. GRIFFEN.